Patented Jan. 18, 1938

2,105,598

UNITED STATES PATENT OFFICE 2,105,598

CONTROL SYSTEM

Karl H. Hubbard, Rochester, N. Y., assignor to Taylor Instrument Companies, Rochester, N. Y., a corporation of New York Application January 4, 1933, Serial No. 650,101

24 Claims. (Cl. 172—239)

This invention relates to control systems and more particularly to electrical control systems. From a still more specific standpoint, the invention relates to a power means for operating a recorder or the like under control of a comparatively sensitive control device such as a pyrometer.

In many control systems it is essential that a control element be moved in a minimum time interval to a predetermined position without "overthrow" and without oscillation or hunting about that position. Such requirements are present in a pyrometer wherein a motor adjusts an indicator, recording pen or control element to a position predetermined by the temperature at the thermocouple.

In accordance with one feature of the present invention, a novel method of control is provided whereby an element is adjusted in response to an unmeasured lack of electrical balance in a normally balanced network, as distinguished from prior methods of adjustment in which the element is adjusted to a predetermined point in response to a measurement of the lack of balance in an electrical network.

In accordance with a further feature of the present invention, a novel method of control is provided for regulating the operation of a motor whereby an element to be adjusted such as a recording pen moves continuously to a predetermined point instead of in periodic steps from one position to another as in former devices. According to this method, the rate of movement during the period of deceleration of the element or pen on approaching a point corresponding to the temperature to be recorded or, in other words, the balance point of an automatic potentiometer pyrometer, is roughly inversely proportional to the remaining distance to be travelled. In this way it is possible to have rapid response without causing "overthrow", that is, without causing the recording pen to advance beyond the desired point.

Other features and advantages will appear as the invention is hereinafter disclosed.

Figure 1:
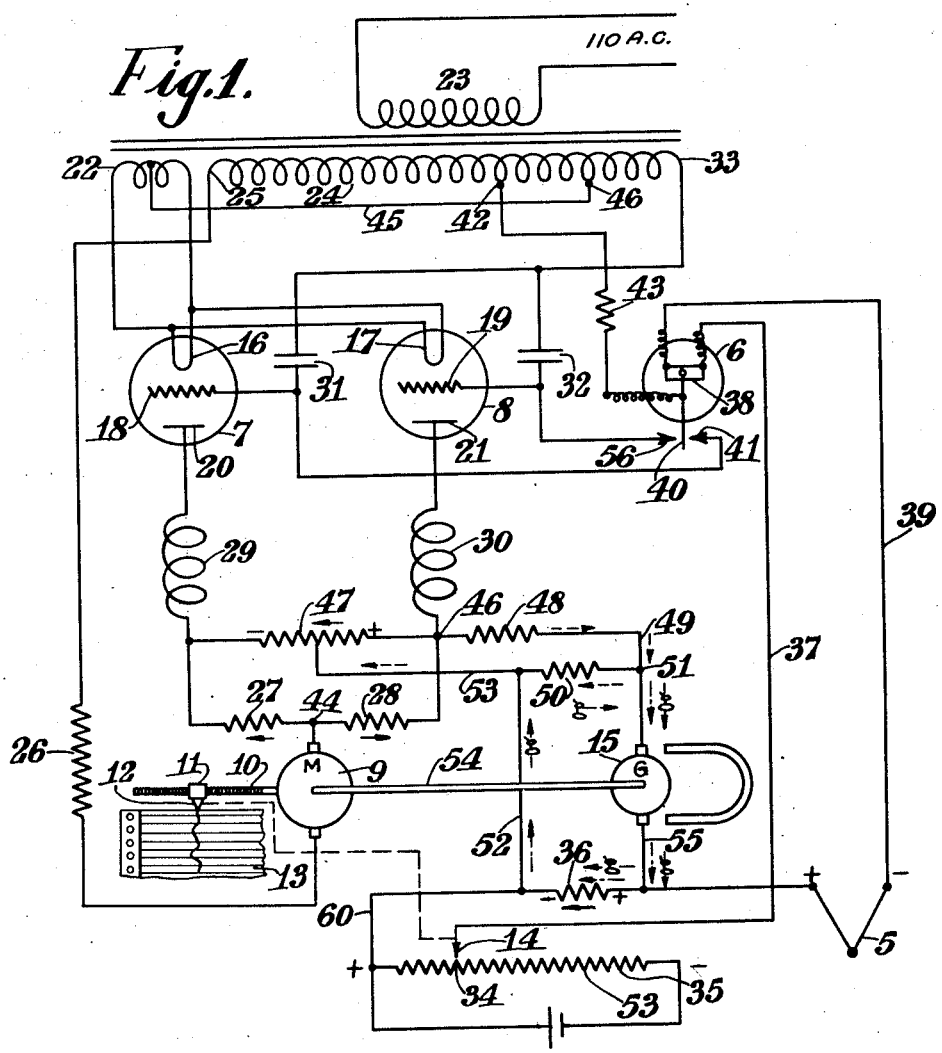
Figure 2:
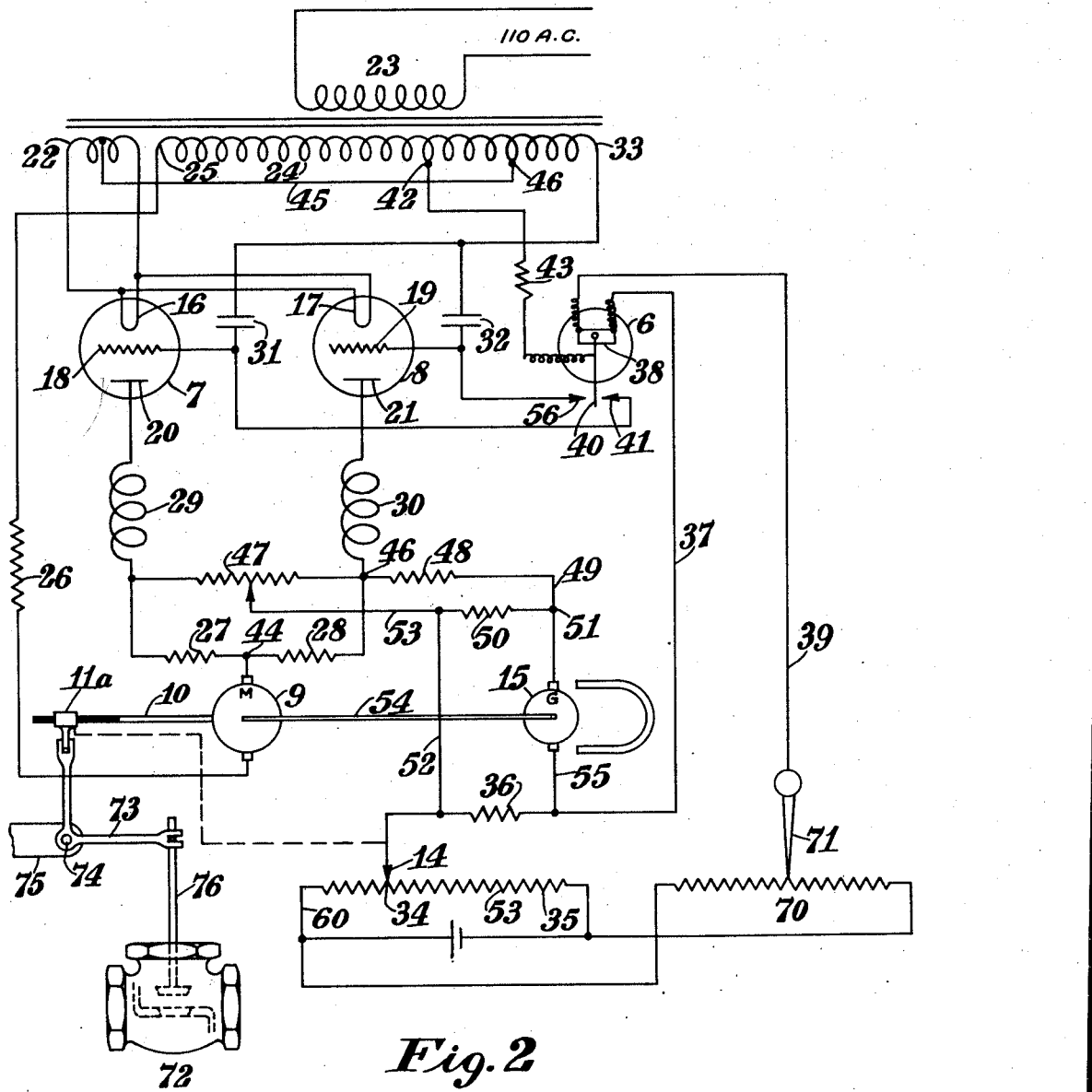

In the drawings Fig. 1 diagrammatically shows the invention in connection with a recording pyrometer; Fig. 2 diagrammatically represents a modified form of the invention incorporated in a system for remotely controlling a device to be regulated.

In Fig. 1, 5 designates a thermocouple which is connected in a potentiometer circuit network including the contact galvanometer 6. This contact galvanometer controls a circuit network for operating one or the other of two low inertia relays 7 and 8 herein illustrated as being of the type known in the art as electrostatically controlled arc discharge devices or relays. These relays, as will be pointed out, control the operating circuits of a small, reversible series wound motor 9 which functions through a threaded shaft 10 and a cooperating nut 11 to advance the pen 12 transversely of a clock-actuated chart 13. The nut 11 is mechanically connected (as indicated by the broken line) to a sliding contact 14 included in a potentiometer network to be referred to, so that the sliding contact and pen move simultaneously. The shaft of the motor 9 also serves to drive a small D. C. generator 15 which functions to prevent the motor from advancing the pen 12 on the chart beyond the correct temperature point.

The relays 7 and 8, as is well-known, respectively include filaments or cathodes 16 and 17, control grids 18 and 19 and anodes 20 and 21 mounted in closed envelopes or tubes containing ionizable gas. During the operation of the pyrometer device, the filaments 16 and 17 are normally heated by being connected in parallel in a heating circuit including a secondary winding 22 of a transformer, the primary winding of which is connected to a commercial source of power such as 110 volt alternating current. This transformer is also provided with an additional secondary winding 24, the terminal 25 of which is connected through the resistor 26, armature of the motor 9 and resistors 27 and 28, the field coils 29 and 30 of the motor, in parallel, to the anodes 20 and 21, the control grids 18 and 19 normally are respectively connected in multiple through the small fixed capacitors 31 and 32, to the terminal 33 of the transformer winding 24.

With this brief outline of the elements of the system, it is believed that the invention will best be understood by describing the operations incident to causing the pen 12 to make a record on the chart 13 in accordance with the temperature condition indicated by the thermocouple 5. Let it be assumed that this temperature rises so that the balance point of the potentiometer network instead of being at the point 34, as indicated, will be at the point 35. Due to this unbalance, current will flow in a circuit traceable from the negative terminal of the thermocouple 5, conductor 39, coil 38 of the galvanometer, conductor 37, the sliding contact 14, left hand section of the potentiometer slide wire, conductor 60, resistor 36, to the positive terminal of the thermocouple. Current flowing in the circuit just described sets up a difference of potential across the resistor 36 as indicated by the signs adjacent its terminals; likewise current flowing through the actuating coil 38 of the galvanometer causes it to move its needle 40 into engagement with the contact 41.

The closure of this contact connects the point 42 of the secondary winding 24 of the transformer through the resistor 43 to the control grid 18 of the relay device 7. The completion of this circuit causes, by the well-known method of phase displacement, an arc discharge to develop periodically between the cathode 16 and the anode 20 of this device, once during each cycle of the current from the commercial source. On each formation of an arc, current flows in a circuit from the terminal 25 of the transformer winding 24, resistor 26, through the armature of the motor 9 to the point 44 where it divides, one part flowing through resistor 27, field coil 29 of the motor, anode 20, across the space in relay 7, cathode 16, the heating conductors of cathode 16, thence through the conductor 45 connected to the intermediate point of the transformer winding 22 to point 46 on the other secondary winding 24 of the transformer and thence to terminal 25. From the point 44 where the current divides, a portion of it flows through resistor 28 of the anticipating network to the point 46 where again the current divides, most of it continuing through the resistor 47, thence through the field coil 29 and the remainder of the anode circuit previously described. From the point 46 the remaining portion of the current flows in a branch circuit indicated by the dotted arrows through the resistor 48, conductor 49, resistor 50, conductor 53 and thence through the left hand portion of resistor 47 over the remainder of the circuit including field coil 29, as described. A portion of the current flowing through resistor 48 divides at point 51 and tends to flow in a branch circuit indicated by the dot and dash arrows and traceable from point 51 through the D. C. generator 15, resistor 36, conductor 52 and then through the remainder of the circuit including field coil 29 as previously described.

It will thus be noted that the difference in potential across resistor 36 due to the flow of thermocouple current therethrough, is of the same sign as the difference of potential across this resistor due to the flow of current in that portion of the anticipating network, including conductor 55 with the result that the current which would otherwise flow through the galvanometer coil 38 is decreased and in certain instances even reversed in direction. Thus an anticipating control of limited effect, is present during all periods of operation of the motor, but which effects the deceleration of the motor most effectively in the case of relatively small movements of the pen.

The flow of current through the relay 7 causes the motor 9 to rotate its shaft 54 which, in turn, rotates the D. C. generator. The motor 9 thus immediately starts to accelerate but the torque thereof and the inertia of its rotating parts are such that there will be a short period of delay before it reaches its normal, uniform speed. During this period the recording pen 12 and the sliding contact 14 of the potentiometer move toward the new balancing point 35 with increasing speed. As the speed of the motor increases, the D. C. generator 15 generates a small electromotive force that is proportional to its speed of rotation. The electromotive force tends to cause a current to flow in a path indicated by arrows designated by a "g" which path is traceable through conductor 55, resistor 36, conductor 52, resistor 50, generator 15 and thence to conductor 55.

The resistor 36 which has a resistance value of only a few ohms, does not disturb the thermocouple circuit, but it does tend to cause a part of the current of the D. C. generator and that due to the mentioned anticipatory resistance networks to flow through the thermocouple circuit and the galvanometer coil 38. These currents thus applied are in the opposite direction to that which flows through the thermocouple due to the lack of potentiometer balance and they therefore tend to open the contact between the needle 40 of the galvanometer and its contact 41. Lack of potentiometer balance establishes an electromotive force in the circuit of the thermocouple and the galvanometer coil which tends to keep the galvanometer needle 40 against its contact 41. As the sliding contact 14 approaches the balance point 35 of the potentiometer, the electromotive force due to the lack of potentiometer balance decreases as a result of the movement of sliding contact 14 and the electromotive force due to the generator 15 increases to supplement that of the anticipatory network so that at some point such as 53, these two electromotive forces will be equal and opposite to that which normally causes current to flow through the galvanometer coil 38, thermocouple 5, a portion of the potentiometer, and resistor 36, with the result that no current will flow through the galvanometer coil, and therefore the needle 40 will disengage its contact 41. Because of the inertia of the several parts, the sliding contact 14 will pass the point 53 before the contacts 40 and 41 are opened due to the time required for the galvanometer to operate. When these contacts are opened, the relay 7 stops passing current and the torque of the motor 9 drops to zero, but the recording pen 12 and the sliding contact 14 will continue to move or "coast" a certain distance, as determined by the inertia and the friction of the moving parts. During this "coasting" period, the generator 15 contiues to generate the electromotive force which tends to move the galvanometer needle 40 to the left to close the contact 56 and when this occurs, relay 8 periodically passes current through the motor 9 thereby setting up a reverse torque or braking action tending to stop the motor quickly. These "coasting" and braking operations may be repeated several times during the deceleration of the pen and its associated sliding contact 14, until these elements are approximately at the position indicated by the null point of the potentiometer. At this time there may be a slight movement of these elements under the power of the motor 9 which is followed by a very slight coasting movement to the exact position indicated by the null point. The movement of the pen and its associated sliding contact may, for example, have the following series of steps: (1) Gradual acceleration due to the speeding-up of the motor, (2) a uniform motion due to the motor attaining its normal speed, (3) a period of "coasting", (4) a period of braking, due to the reversed torque of the motor 9, (5) a second period of "coasting", (6) a second period of braking due to the reversed torque of the motor 9, (7) a slight acceleration under the power of the motor 9, and (8) a very short period of "coasting" to the desired point. It will be understood, of course, that the periods of "coasting", braking and acceleration may vary in number from the above example, but they are sufficient to give an understanding of the operation of the system.

The foregoing description has referred to the operation where the movement of the pen 12 has been relatively large. When, however, this pen movement and its related sliding contact movement is to be a minimum such as 1/100", the anticipation is effected in a somewhat different manner since the generator has no noticeable effect at this time. In this instance also the galvanometer needle will engage one of its contacts, e. g. 41, which causes the relay 7 to pass current through the motor 9 with the result that this motor starts to rotate. It is important that the galvanometer needle 40 be moved to its open position very quickly in order to prevent the recording pen 12 from moving a distance greater than 1/100". In this instance the anticipation is effected almost entirely by the resistors 27, 28, 47, 48 and 50 of the anticipating network which are effective to tend to cause a small fraction of the motor current to flow through the resistor 36, as previously pointed out, and through the galvanometer coil 38 tending to move the needle to its open position. Thus it results that as the needle 40 engages contact 41 the motor 9 starts to operate and a small amount of current is caused to flow through the galvanometer coil 38 in a direction that tends to move the needle 40 to its open position, so that if the adjustment of the pen 12 is to be very small the needle 40 of the galvanometer will engage contact 41 for only a few tenths of a second.

Let it be assumed that the temperature to which the thermocouple 5 is exposed, falls, then the current flowing through it and through the coil 38 of the galvanometer will be in the reverse direction to that which flowed when the thermocouple was exposed to a rising temperature. Consequently the coil 38 will move the galvanometer needle 40 into engagement with the contact 56. The closure of this contact causes the relay 8 to function in the same manner as previously described in connection with the relay 7. Therefore current will flow periodically through relay 8 each time that an arc is formed across its elements, that is, once during each cycle of the commercial source. On each formation of the arc, current flows in a circuit traceable from the terminal 25 of the transformer 24, resistor 26, through the armature of the motor 9 to point 44, where it divides, one part flowing through the resistor 28, field coil 30 of the motor, anode 21 across the space of the relay 7, cathode 17, the heating conductors of cathode 17, thence to the conductor 45 connected to the intermediate point of the transformer winding 22 to point 46 on the secondary winding 24 of the transformer and thence to the terminal 25. From point 44 current divides and a portion of it flows through resistor 27, resistor 47 and thence through the field coil 30 and the remainder of the circuit through the relay as previously described. It is unnecessary to further describe the currents flowing through resistors 47, 48, 50 and 36, but it is sufficient to state that current flows through these elements in directions opposite to those indicated by the arrows associated therewith, so that this anticipating control is effective in tending to break contact between the galvanometer needle 40 and the contact 56. Similarly when motor 9 speeds up, the D. C. generator causes current to flow in the opposite direction to that in the case of the rising temperature so that this generator likewise is effective also to cooperate in anticipating control during the larger movement of the pen in the case of falling temperatures.

The modified form of the invention diagrammatically shown in Fig. 2 is similar to that illustrated in Fig. 1 except that the primary element or thermocouple 5 of Fig. 1 has been replaced by a potentiometer 70, the slider or movable element 71 of which is adjusted either manually or automatically in any well-known manner.

Furthermore, the arrangement of Fig. 2 differs from the arrangement of Fig. 1, in that the recording device including the stylus 11 has been omitted and instead the threaded shaft 10 of the motor 9 carries a travelling nut 11a. This nut actuates one arm of the bell crank 73 which is pivoted at 74 on a fixed bracket 75. The other arm of the bell crank 73 at its free end engages the valve stem 76 of the valve 72 so that the valve is opened or closed depending upon the direction that the bell crank 73 is actuated by the travelling nut 11a.

The operation of the system of Fig. 2 is substantially identical with the operation of the system of Fig. 1, as previously described, except that in this modification as the arm 71 is adjusted along the resistor of the potentiometer 70, the electrical balance of the system is disturbed, whereupon the motor 9 is actuated to restore the electrical balance and simultaneously to move the travelling nut 11a so that the valve stem 76 is adjusted whereby the proper setting of the valve 72 is effected.

It will be understood that the invention is not limited to the circuit networks herein disclosed, or to the continuous or progressive operating movement of the regulated mechanism but instead, other types of circuit arrangements may be utilized and intermittent or step-by-step operating movements of the regulated mechanism may be employed, all within the scope of the following claims.

I claim:

1. In an arrangement of the class described, a normally balanced primary network including an element cooperating with said network to determine a point of balance therefor, and means responsive to the establishment of balance, a member movable to a position corresponding to the point of balance, a motor controlled by said means for operating said member, and a secondary network cooperating with said motor, said means being responsive to said secondary network always in a substantially given amount and in the opposite sense from its response to said primary network and functioning to cause said motor to stop said member in the position corresponding to the point of balance.

2. In an arrangement of the class described, a normally balanced primary network including an element cooperating with said network to determine a point of balance therefor, a contact galvanometer responsive to the establishing of the point of balance, a member movable to a position corresponding to the point of balance, a motor controlled through the contacts of said galvanometer for operating said member, a secondary network including a generator operated by said motor in proportion to the speed thereof, said galvanometer being responsive to said secondary network in the opposite sense from its response to said primary network and functioning to cause said motor to stop said member in the position corresponding to the point of balance.

3. In a device of the class described, a normally balanced primary network including an element responsive to changing conditions to unbalance said network and means having an active and an inactive condition, said means being responsive to the lack of balance of said primary network to establish its active condition, a member movable to restore the balance of said network and thereby cause said means to return to its inactive condition, a motor controlled by said means in its active condition for operating said member, a secondary network cooperating with said motor, said means being responsive to said secondary network always in a substantially given amount and in the opposite sense from its response to said primary network whereby it returns to its inactive condition when said responses are equal but before said primary network is balanced.

4. In a device of the class described, a normally balanced primary network including an element responsive to changing conditions to determine the balance point of said network, a contact galvanometer having an active and an inactive condition, said galvanometer being responsive to the lack of balance of said primary network to establish its active condition, a member movable to restore the balance of said network and thereby cause said galvanometer to return to its inactive condition, driving mechanism controlled by said galvanometer in its active condition for operating said member, and a secondary network having current generating mechanism connected therein which is controlled by said driving mechanism in proportion to its speed, said galvanometer being responsive to said secondary network in the opposite sense from its response to said primary network whereby it returns to its inactive condition when said responses are equal but before said primary network is balanced.

5. In a device of the class described, an adjustable element, means deflectable in response to a change in a condition, means governed by said deflecting means and including a motor for moving said element to a predetermined point, and a plurality of controlling means for decelerating said motor when said element is in the region of the predetermined point, one of which controlling means is effective in amounts proportional to the speed of the motor, and the other of which controlling means operates electrically and independently of the speed of said motor.

6. In a device of the class described, a detector comprising an electrical network having a condition-responsive element and a contact galvanometer connected therein, an amplifier including two low inertia relays controlled by said contact galvanometer, a movable member, a motor for moving said member to a predetermined point under the control of said amplifier, and means cooperating with said motor to reduce the current through said element to zero as said member approaches said predetermined point whereby the deceleration of said motor is completed when said predetermined point is reached.

7. In a device of the class described, a detector comprising an electrical network having a thermo-responsive element and a contact galvanometer connected therein, an amplifier including two low inertia relays controlled by said contact galvanometer, a movable member, a motor for moving said member to a predetermined point under the control of said amplifier, and means for making said galvanometer responsive to the motor speed and to the current through said motor for stopping said member at the predetermined point.

8. In a device of the class described, a detector comprising an electrical network having a thermo-responsive element and a contact galvanometer connected therein, said network being normally electrically balanced, said element being responsive to changing conditions to which it is exposed for determining the electrical balance of said network, an amplifier including two low inertia relays controlled by said contact galvanometer, a movable member, a motor for progressively moving said member under the control of said amplifier to a predetermined point as indicated by said network unbalance, and anticipating and restoring means including said motor to reestablish a condition of balance in said network, said last-mentioned means serving to decelerate said motor during part of the time that said condition of balance is being restored.

9. In a device of the class described, a detector comprising an electrical network having a thermo-responsive element and a contact galvanometer connected therein, said network being normally electrically balanced, said element being responsive to a changing condition for disturbing the electrical balance of said network, an amplifier including two low inertia relays controlled by said contact galvanometer, a movable member, a motor for progressively moving said member under the control of said amplifier to a predetermined point as indicated by the lack of balance of said network, and anticipating means responsive to the rate of restoring said balance for decelerating said motor.

10. In a device of the class described, a detector comprising an electrical network having a thermo-responsive element and a contact galvanometer connected therein, said network being normally electrically balanced, said element being responsive to a changing condition for disturbing the electrical balance of said network, an amplifier including two low inertia relays controlled by said contact galvanometer, a movable member, a motor for progressively moving said member under the control of said amplifier to a predetermined point as indicated by the lack of balance of said network, and anticipating means responsive to the action and direction of action of said movable member for decelerating said motor.

11. The method of restoring the balance of a normally balanced electrical network which comprises detecting the electrical unbalance of said network, adjusting said network in response to a detected electrical unbalance thereof and in such a manner as to decrease the amount of detected unbalance, while simultaneously further decreasing in said network the amount of detected unbalance thereof both statically and kinetically until a balanced condition is reestablished.

12. The method of restoring the balance of an electrical system unbalanced by change of an electromotive force therein which comprises adjusting said system in response to the lack of electrical balance thereof and in such a manner as to decrease said lack of balance, while simultaneously further decreasing the effect of said change of electromotive force by developing both electrically and electro-dynamically in a portion of said system an electromotive force of opposite effect from said first-mentioned electromotive force, until a balanced electrical condition is reestablished in said system.

13. The method of restoring the balance of a normally balanced control system which comprises commencing and continuing the adjustment of said system in response to an unbalance thereof and in such a manner as to decrease the amount of unbalance and suddenly further decreasing the amount of unbalance of the system always a substantially given amount at the commencement of said adjustment until a balanced condition is reestablished.

14. In a device of the class described, a detector comprising an electrical network having a condition-responsive element and a contact galvanometer connected therein, an amplifier including two low inertia relays respectively controlled by said contact galvanometer, a movable member, a motor for moving said member to a predetermined point under the control of said amplifier, and means including a magneto generator driven by said motor and serving to reduce the current through said galvanometer to zero as said member approaches said predetermined point whereby the deceleration of said motor is completed when said predetermined point is reached.

15. The method of effecting anticipatory control of the motion of a member which consists in supplying the energy required to produce motion of said member and thereafter suddenly reducing the amount of energy supplied to said member both according to the rate of movement of the member and according to said required energy.

16. The method of positioning a member in accordance with changes in a condition to be controlled which consists in supplying energy to said member beginning with the instant of change in said condition, thereafter suddenly decreasing the energy being supplied to said member and finally removing the energy from said member before it arrives at its final position, the decrease in said energy being in amounts proportional to the energy being supplied and proportional to the motion of said member.

17. An electrical network unbalanced upon a change in magnitude of a measured condition, a contact galvanometer having contacts closed in response to application of a torque produced by unbalance of the network, an impedance adjustable to rebalance said network, a driving system responsive to the closing of said contacts, and means including means operated by said driving system for introducing into said network a voltage of a magnitude varying as a direct function of the speed of said driving system.

18. The method of restoring the balance of a normally balanced electrical network which comprises detecting an electromotive force due to the lack of balance of said network, adjusting said network in response to the detected electromotive force and in such a manner as to decrease the detected electromotive force by introducing into said network an opposing electromotive force having a fixed value at the commencement of said adjustment and by introducing an electromotive force varying according to the rate of said adjustment until a balanced condition is reestablished.

19. The method of restoring the balance of an electrical network unbalanced by a change of an electromotive force therein which comprises adjusting said network in response to the lack of balance thereof and in such a manner as to decrease said electromotive force until a balanced condition is reestablished while simultaneously further decreasing the effect of said change of electromotive force by developing in a portion of said network a second electromotive force of opposite effect from said first mentioned electromotive force, said second electromotive force being the algebraic sum of a substantially fixed electromotive force and an electromotive force varying in value according to the rate of said adjustment.

20. The method of restoring the balance of a normally balanced electrical network which comprises commencing and continuing the adjustment of said network in response to a lack of unbalance thereof, and in such a manner as to decrease the lack of balance and suddenly further decreasing the amount of unbalance of the system always a substantially given amount at the commencement of said adjustment and also further decreasing the unbalance of the network according to the first power of the rate of adjustment until the balanced condition is reestablished.

21. In a device of the class described, a detector comprising an electrical network having a condition responsive element and a contact galvanometer connected therein, a movable member, a motor for moving said member to a predetermined position under the control of said galvanometer, and means cooperating with said motor to reduce the current through said element to zero as said member approaches said predetermined position, whereby the deceleration of said motor is completed when said predetermined point is reached.

22. In a device of the class described, a detector comprising an electrical network having a condition-responsive element and a contact galvanometer connected therein, means controlled by said contact galvanometer, a movable member, a motor for moving said member to a predetermined point under the control of said means, and means including a magneto generator driven by said motor and serving to reduce the current through said galvanometer to zero as said member approaches said predetermined point whereby the deceleration of said motor is completed when said predetermined point is reached.

23. In a system of the class described comprising a primary electrical network having connected therein a thermocouple, an impedance and a device controlled by the electrical condition of said network, an adjustable member, a motor for adjusting said member to a predetermined position under the control of said device, a second electrical network having a substantially fixed electrical effect developed therein, means for generating an electrical effect varying in value in accordance with the speed of said motor, and means for supplying the algebraic sum of said fixed electrical effect and said varying electrical effect across said impedance and in opposition to the electrical effect developed by said thermocouple whereby the deceleration of said motor is completed when said member reaches said predetermined position.

24. In a system of the class described comprising a primary electrical network having connected therein a thermocouple, an impedance and a device controlled by the electrical condition of said network, an adjustable member, a motor for adjusting said member to a predetermined position under the control of said device, a second electrical network having a substantially fixed electromotive force developed therein, means for generating an electromotive force varying in value in accordance with the speed of said motor, and means for supplying the algebraic sum of said fixed electromotive force and said varying electromotive force across said impedance and in opposition to the electromotive force developed by said thermocouple whereby the deceleration of said motor is completed when said member reaches said predetermined position.

KARL H. HUBBARD.